United States Patent
Oshiro et al.

(10) Patent No.: US 6,280,003 B1
(45) Date of Patent: Aug. 28, 2001

(54) METHOD OF BRAKING FORCE DISTRIBUTION CONTROL FOR A VEHICLE HYDRAULIC DEVICE

(75) Inventors: Hiroshi Oshiro; Hiromitsu Nishizawa; Makoto Taguchi, all of Shizuoka-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/457,614

(22) Filed: Dec. 8, 1999

(30) Foreign Application Priority Data

Dec. 8, 1998 (JP) .................................................. 10-348742

(51) Int. Cl.$^7$ ..................................................... B60T 13/00

(52) U.S. Cl. .......................... 303/9.62; 303/146; 303/140

(58) Field of Search .................................. 303/9.62, 146, 303/147, 150, 140

(56) References Cited

U.S. PATENT DOCUMENTS

| | | | |
|---|---|---|---|
| 4,480,309 | * | 10/1984 | Burckhardt et al. .................. 303/140 |
| 4,484,280 | * | 11/1984 | Brugger et al. ....................... 303/140 |
| 4,998,593 | * | 3/1991 | Karnopp et al. ...................... 303/146 |
| 5,140,524 | * | 8/1992 | Matsuda ................................. 303/146 |
| 5,341,297 | * | 8/1994 | Zomotor et al. ...................... 303/146 |
| 5,470,136 | * | 11/1995 | Tozu et al. ............................ 303/147 |
| 5,620,239 | * | 4/1997 | Mihara et al. ......................... 303/147 |
| 5,624,164 | | 4/1997 | Tozu et al. . |
| 5,634,699 | | 6/1997 | Ichikawa et al. . |
| 5,640,324 | | 6/1997 | Inagaki . |
| 5,641,209 | | 6/1997 | Kushi et al. . |
| 5,646,849 | | 7/1997 | Walenty et al. . |
| 5,676,434 | | 10/1997 | Ichikawa et al. . |
| 5,697,682 | | 12/1997 | Watanabe et al. . |
| 5,700,074 | | 12/1997 | Sugimoto et al. . |
| 5,704,695 | * | 1/1998 | Monzaki et al. ...................... 303/146 |
| 5,711,585 | * | 1/1998 | Tozu et al. ............................ 303/146 |
| 5,752,211 | | 5/1998 | Takasaki et al. . |
| 5,752,752 | * | 5/1998 | Tozu et al. ............................ 303/146 |
| 5,758,930 | | 6/1998 | Schiel et al. . |
| 5,762,406 | * | 6/1998 | Yasui et al. ........................... 303/146 |
| 5,772,289 | | 6/1998 | Nakazawa et al. . |
| 5,795,039 | | 8/1998 | Fennel et al. . |
| 5,806,939 | | 9/1998 | Feigel et al. . |
| 5,810,455 | | 9/1998 | Noguchi . |
| 5,810,456 | | 9/1998 | Inagaki et al. . |
| 5,826,954 | | 10/1998 | Schmitt et al. . |
| 5,829,847 | * | 11/1998 | Tozu et al. ............................ 303/147 |
| 5,842,755 | | 12/1998 | Sugimoto et al. . |
| 5,853,229 | * | 12/1998 | Willmann et al. ...................... 303/3 |
| 5,857,754 | * | 1/1999 | Fukami et al. ........................ 303/146 |
| 5,869,943 | | 2/1999 | Nakashima et al. . |
| 5,882,093 | | 3/1999 | Enomoto et al. . |
| 5,887,957 | * | 3/1999 | Buttner et al. ........................ 303/186 |
| 5,913,578 | * | 6/1999 | Tozu et al. ............................ 303/147 |
| 5,927,830 | * | 7/1999 | Tozu et al. ............................ 303/155 |
| 5,931,546 | * | 8/1999 | Nakashima et al. ................. 303/146 |
| 5,938,299 | * | 8/1999 | Hara et al. ............................ 303/186 |

(List continued on next page.)

*Primary Examiner*—R. Oberleitner
*Assistant Examiner*—Devon Kramer
(74) *Attorney, Agent, or Firm*—Bozicevic, Field & Francis LLP; Alan W. Cannon

(57) ABSTRACT

It is an object of this invention to provide a method for when and on which wheel to initiate braking force distribution. In a brake hydraulic device for a motor vehicle, a rear wheel subject to control is an inner or outer wheel is checked; if the outer wheel is to be controlled, deceleration threshold value is increased according to the lateral acceleration, and if the absolute value of the vehicle deceleration exceeds the deceleration threshold value, the braking distribution control is operated on the rear wheel; and if the inner wheel is to be controlled, deceleration threshold value is decreased according to the lateral acceleration, and if the absolute value of vehicle deceleration exceeds the deceleration threshold value, the braking distribution control is operated on the rear wheel.

8 Claims, 8 Drawing Sheets

U.S. PATENT DOCUMENTS

| | | |
|---|---|---|
| 5,947,221 | 9/1999 | Taniguchi et al. . |
| 5,947,224 | 9/1999 | Kouno . |
| 5,951,115 | 9/1999 | Sakai et al. . |
| 6,003,959 * | 12/1999 | Katayose et al. .................... 303/146 |
| 6,089,680 * | 7/2000 | Yoshioka et al. .................... 303/146 |

* cited by examiner

METHOD OF BRAKING FORCE DISTRIBUTION CONTROL FOR A VEHICLE HYDRAULIC DEVICE

FIELD OF THE INVENTION

This invention relates generally to braking force distribution control systems used on a motor vehicle. More specifically, the invention relates to such systems and their method of operation wherein the system comprises a wheel speed sensor and brake activation is controlled using information from wheel speed sensors.

BACKGROUND OF THE INVENTION

Traditional braking force distribution control starts its control on two rear wheels based on the same vehicle deceleration threshold value. However, while the vehicle is turning or the vehicle load shifts in the transverse direction, the traditional control method does not provide appropriate braking force distribution control to compensate for such load shifting. This invention provides initial braking force distribution control correctly compensating for vehicle load shifts.

SUMMARY OF THE INVENTION

A vehicle brake hydraulic device system is disclosed which is comprised of a hydraulic unit having a wheel speed sensor to detect a wheel speed, a main hydraulic circuit connected from a master cylinder to a wheel cylinder via an inlet valve, and an auxiliary hydraulic circuit connected from said wheel cylinder to an auxiliary reservoir via an outlet valve and an electronic control device to control the hydraulic unit. The system operates by (1) independently determining the speed of both rear wheels and (2) determining whether a rear wheel subject to control is an inner or outer wheel when the car is in a turn. Information of the speed of each of the rear wheels is sent to a microprocessor and calculations are carried out to determine if braking force distribution control should be applied and if so on which rear wheel.

If the outer wheel is to be controlled, the deceleration threshold value is increased according to the amount of acceleration in a lateral direction. If the absolute value of vehicle deceleration exceeds the deceleration threshold value, the braking distribution control is operated on the rear wheel. If the inner wheel is to be controlled, deceleration threshold value is decreased according to said acceleration in the lateral direction. Furthermore, if the absolute value of vehicle deceleration exceeds said deceleration threshold value, braking distribution control is operated on the rear wheel. Although it is not necessary, the system preferably includes a sensor for measuring G forces. The sensor can measure G forces when the vehicle accelerates forward or decelerates in braking. Further, the sensor measures lateral acceleration and all the sensor information is sent to the microprocessor. The determination of which wheel to activate braking force distribution control can be based solely on wheel speed sensors, solely on one or more G force sensors or a combination of data from both wheel speed sensors and G force sensors. The system provides an improved method of braking force distribution control.

In a normal braking force distribution control, one whole process of control must be conducted on each rear wheel. For example, one group of processing is first conducted on a right rear wheel, then another group on a left rear wheel. Here, provided that the right rear wheel is processed first, the system determines whether the right rear wheel is located at an inner side of the curve or an outer wide of the curve. If the right rear wheel is located at the outer side, then a threshold deceleration value is increased based on the lateral acceleration which is determined by a G sensor or other information. If the right rear wheel is located at the inner side, then the threshold deceleration value is decreased based on the lateral acceleration. After this, the left rear wheel is processed in the same matter.

The invention may comprise a vehicle brake hydraulic device comprising a hydraulic unit having a wheel speed sensor to detect a wheel speed, a main hydraulic circuit connected from a master cylinder to a wheel cylinder via an inlet valve, and an auxiliary hydraulic circuit connected from the wheel cylinder to an auxiliary reservoir via an outlet valve and an electronic control device to control the hydraulic unit. The device of the invention determines whether a rear wheel subject to control is an inner or outer wheel. If the outer wheel is to be controlled, deceleration threshold value is increased according to an acceleration in the lateral direction. If the absolute value of vehicle deceleration exceeds the deceleration threshold value; a slip threshold value is increased according to the difference between an inner wheel speed and an outer wheel speed. Further, when the rear wheel slip ratio exceeds the slip threshold value, the braking distribution control is operated on the rear wheel. If the inner wheel is to be controlled, the deceleration threshold value is decreased according to the acceleration in the lateral direction. If the absolute value of vehicle deceleration exceeds the deceleration threshold value; the slip threshold value is decreased based on the difference between an inner wheel speed and an outer wheel speed. When the rear wheel slip ratio exceeds the slip threshold value, the braking distribution control is operated on the rear wheel.

Another embodiment of the invention provides a method of braking force distribution control for a vehicle brake hydraulic device. The device comprises a hydraulic unit having a wheel speed sensor to detect a wheel speed; a main hydraulic circuit connected from a master cylinder to a wheel cylinder via an inlet valve, an auxiliary hydraulic circuit connected from the wheel cylinder to an auxiliary reservoir via an outlet valve, means for detecting acceleration of a vehicle movement, and an electronic control device to control the hydraulic unit. The device independently determines the speeds of rear wheels of the vehicle, and determines whether to apply braking force distribution to an inner rear wheel or an outer rear wheel. If the rear wheel subject to control stands an outer rear wheel application of braking force distribution control is effected to the outer rear wheel when a deceleration threshold value is increased according to acceleration of a vehicle lateral direction and the absolute value of vehicle deceleration exceeds the deceleration threshold value. If the rear wheel subject to control stands an inner rear wheel, application of braking force distribution control is effected to the inner wheel when a deceleration threshold value is increased according to lateral acceleration acting on the vehicle and the absolute value of vehicle deceleration exceeds the deceleration threshold value.

In yet another embodiment the invention provides a method of braking force distribution control for a vehicle brake hydraulic system. The system is comprised of a hydraulic unit having a wheel speed sensor to detect a wheel speed; a main hydraulic circuit connected from a master cylinder to a wheel cylinder via an inlet valve, an auxiliary hydraulic circuit connected from the wheel cylinder to an auxiliary reservoir via an outlet valve, means for detecting acceleration of a vehicle movement, and an electronic control device to control the hydraulic unit. The system determines the wheel speed of at least two rear wheels and determines whether to apply braking force distribution control to an inner rear wheel or an outer rear wheel. If the rear wheel subject to control stands an outer rear wheel, application of braking force distribution control is effected to the outer rear wheel when a deceleration threshold value is increased according to acceleration of a vehicle lateral direction, and the absolute value of vehicle deceleration exceeds the deceleration threshold value. Then a slip threshold value is increased according to a difference between the inner wheel speed and the outer wheel speed, and the rear wheel slip ratio exceeds the slip threshold value.

If the rear wheel subject to control stands an inner rear wheel, application of braking force distribution control is effected to the outer rear wheel when a deceleration threshold value is decreased according to acceleration of a vehicle lateral direction, and the absolute value of vehicle deceleration exceeds the deceleration threshold value. Then a slip threshold value is decreased according to a difference between the inner wheel speed and the outer wheel speed, and the rear wheel slip ratio exceeds the slip threshold value.

BRIEF DESCRIPTION OF THE DRAWINGS

The above and other embodiments, objects and features as well as this attendant advantages of the present invention will become readily apparent by reference to the following detailed descriptions when considered in conjunction with the accompanying drawings wherein.

DETAILED DESCRIPTION OF THIS INVENTION

Summary of the Vehicle Brake Hydraulic Pressure Device

Figure 1:
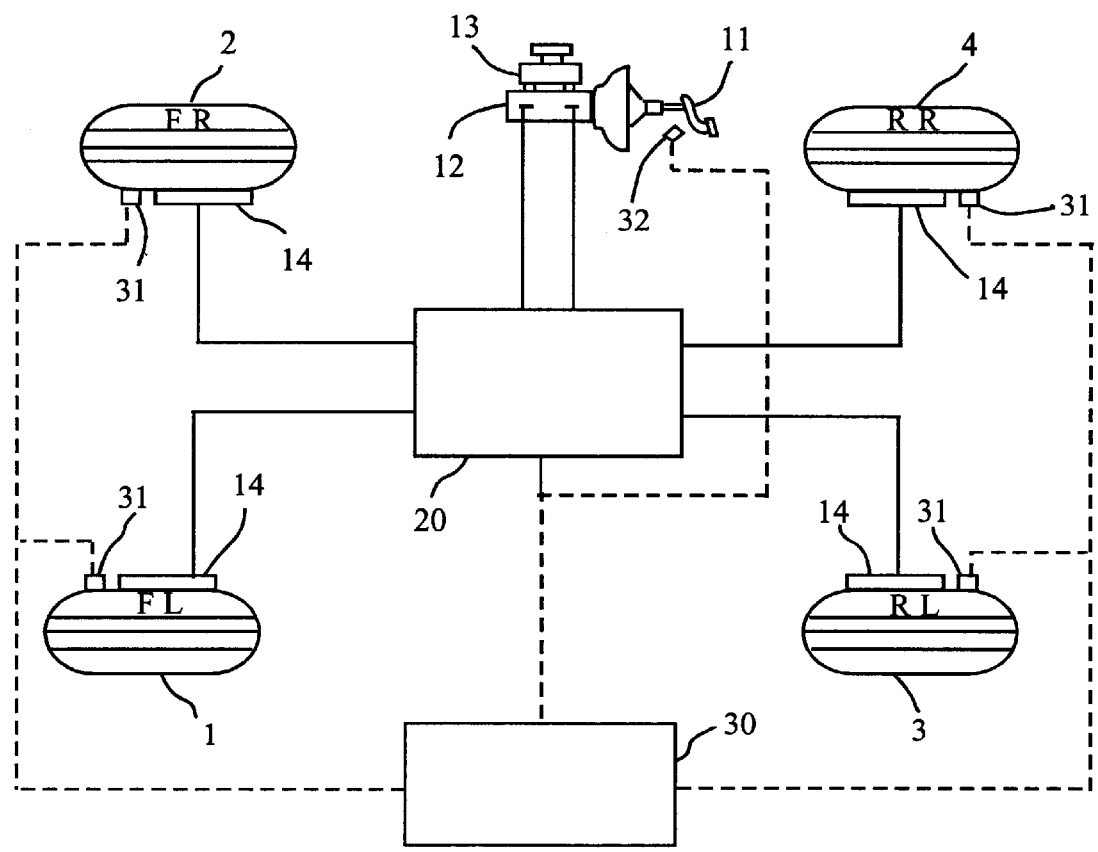
FIG. 1 is a schematic view of the brake control device.

As shown in FIG. 1, in a brake hydraulic pressure device for a motor vehicle, hydraulic pressure is created in the hydraulic unit 20. This pressure is transferred to each wheel cylinder 14 of the front and rear wheels in order to operate the brake control on each of the four wheels (i.e., left front wheel 1, right front wheel 2, left rear wheel 3, right rear wheel 4). A braking force distribution control system and an anti-lock brake control system (ABS), operate using signals from different sources such as wheel speed sensor 31 and brake switch 32. The electronic control device 30 controls the hydraulic unit 20 thereby providing optimum brake control relative to vehicle wheels. The electronic control device 30 includes a brake pedal operation judging means which regulates the stepping speed of the brake pedal. The electronic control device 30 may include additional components such as special hardware and conventional computing devices such as a microcomputer.

Summary of the Hydraulic Unit

Figure 2:
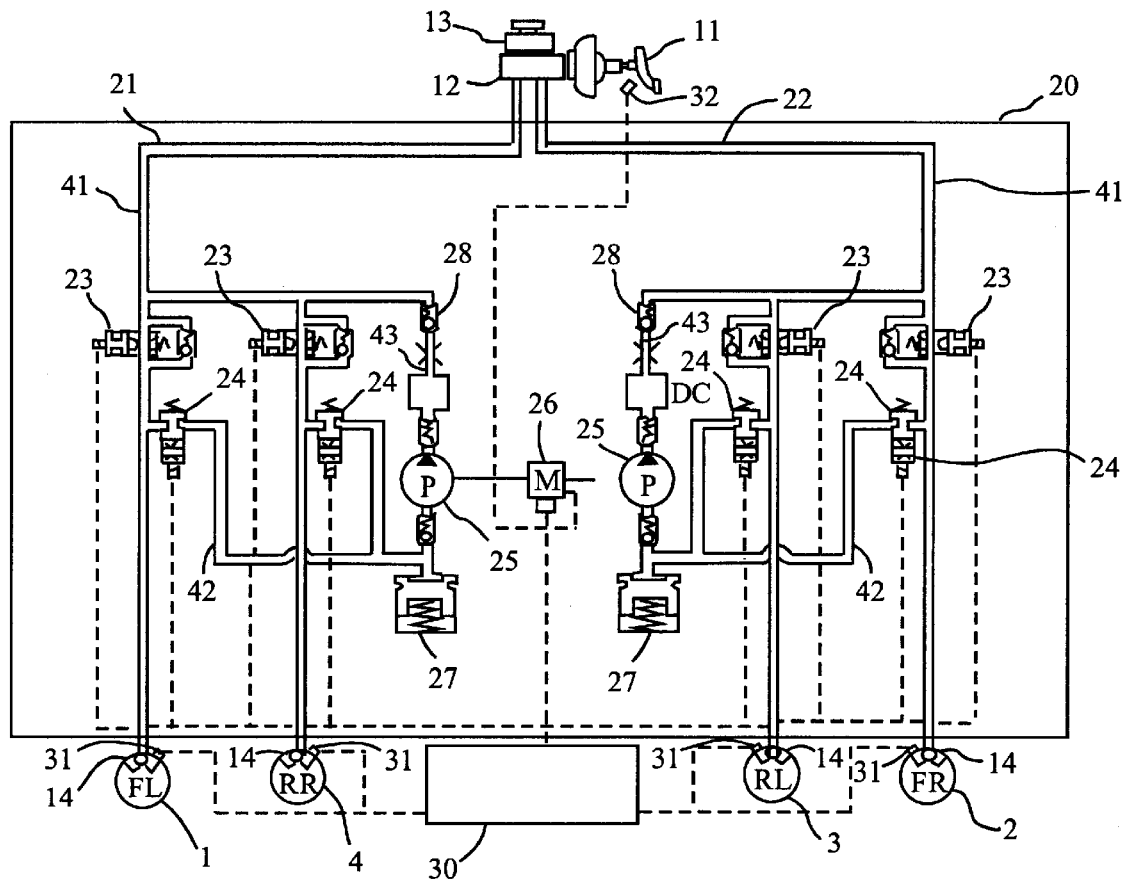
FIG. 2 is a circuit view of the brake hydraulic device for four wheels.

An embodiment of a hydraulic unit 20 is shown in FIG. 2. The hydraulic unit 20 comprises hydraulic circuits such as braking force distribution control system and ABS. FIG. 2 shows an example of X-piping, where the left front wheel 1 and right wheel 4 are connected to a first hydraulic circuit 21. The right front wheel 2 and left rear wheel 3 are connected to the other independent second hydraulic circuit 22.

The hydraulic unit 20 comprises the main circuit 41 connecting with each wheel cylinder 14 via the master cylinder 12 and the inlet valve 23. In addition, a connection is provided between the auxiliary hydraulic circuits 42 and the auxiliary reservoirs 27 via each wheel cylinder 14 and the outlet valve 24. Further, a connection returning the reverse hydraulic circuit 43 from the auxiliary reservoir 27 to the main hydraulic circuits 41 via the pumps 25 is also provided. The hydraulic unit 20 controls the opening and closing of the inlet valve 23 and the outlet valves 24 thereby operating specified brake control for each wheel. In addition, the main reservoir 13 reserves the brake fluid and prevents a reverse flow. The motor 26 operates and controls the pumps 25.

Operation of the brake hydraulic pressure device is explained below.

Summary of Brake Control

Figure 3:
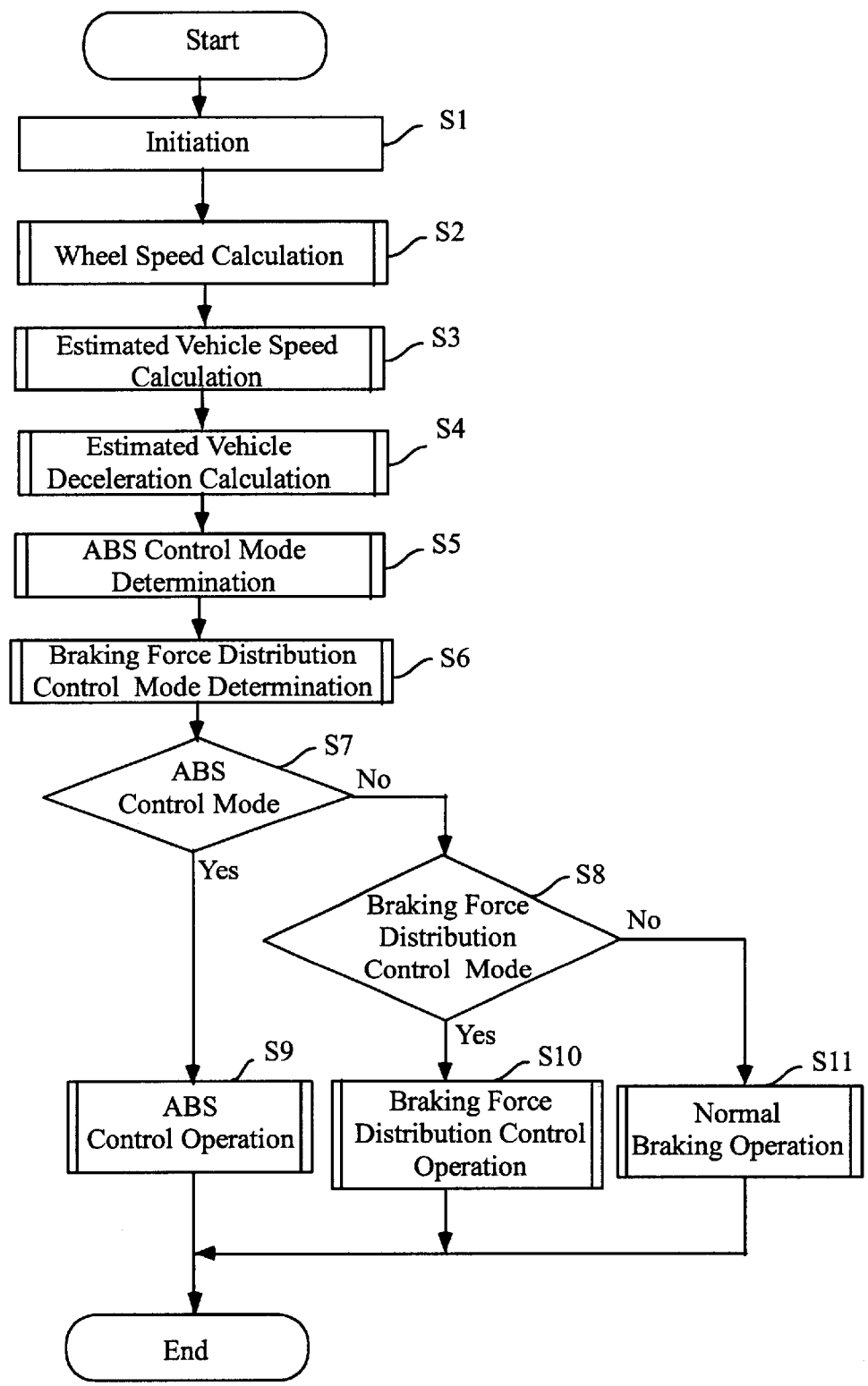
FIG. 3 is a flow-chart of the brake control.

FIG. 3 shows an embodiment of how the electronic control device 30 conducts a brake control calculation using a signal obtained from the wheel speed sensors 31 and the brake switch 32. First, the device 30 is initialized (S1), and the wheel speeds are determined by signals obtained from the wheel sensor 31 (S2). An estimation of the deceleration of a front wheel (value determined by wheel deceleration of front two wheels) is obtained. Further, an estimation of the wheel deceleration of rear wheel (value determined by wheel deceleration of rear two wheels) is also obtained. Both estimates are determined by wheel speed information (S3, S4). More specifically, the estimates are obtained using information such as wheel speeds, the estimated vehicle speed and estimated vehicle deceleration speed (value determined by the deceleration of front and rear four wheels). From the value determined, the brake control modes such as anti-lock brake control mode or a braking force distribution mode are selected (S5, S6). For the anti-lock brake control mode (S7), the anti-lock control is operated (S9), but the anti-lock brake control mode is not selected (S7) and the braking force distribution control mode is evaluated (S8). For the braking force distribution control mode (S8), braking force distribution control (S10) is operated. However, if no braking force distribution mode is selected (S8), the brake operation (S11) is maintained in its normal mode.

Normal Brake Control

During normal brake control operation the brake pedal 11 is stepped on thereby creating hydraulic pressure at the master cylinder 12. Since the inlet valve 23 is open while the outlet valve 24 is closed, the brake hydraulic pressure created at the master cylinder 12 is directly transferred to the wheel cylinders 14. The results in the application of a braking force on the respect vehicles wheels 1,2,3 and 4.

Anti-lock Brake Control

The electronic control device 30 operates the anti-lock control. For example, the device 30 controls the opening and closing of the inlet valve 23 and the outlet valve 24 and controls the pumps 25 when the vehicle is braked and locked.

During anti-lock brake control, hydraulic pressure is controlled by quickly and repeatedly increasing holding, and decreasing pressure during every cycle. For instance, during the pressure increase mode of one cycle, the opening and closing of the inlet valve 23 is controlled and the outlet valve 24 is closed thereby increasing the pressure of the brake fluid at the wheel cylinder 4.

Operation of braking force distribution control is explained below.

Braking Force Distribution Control While Making a Turn

Figure 4:
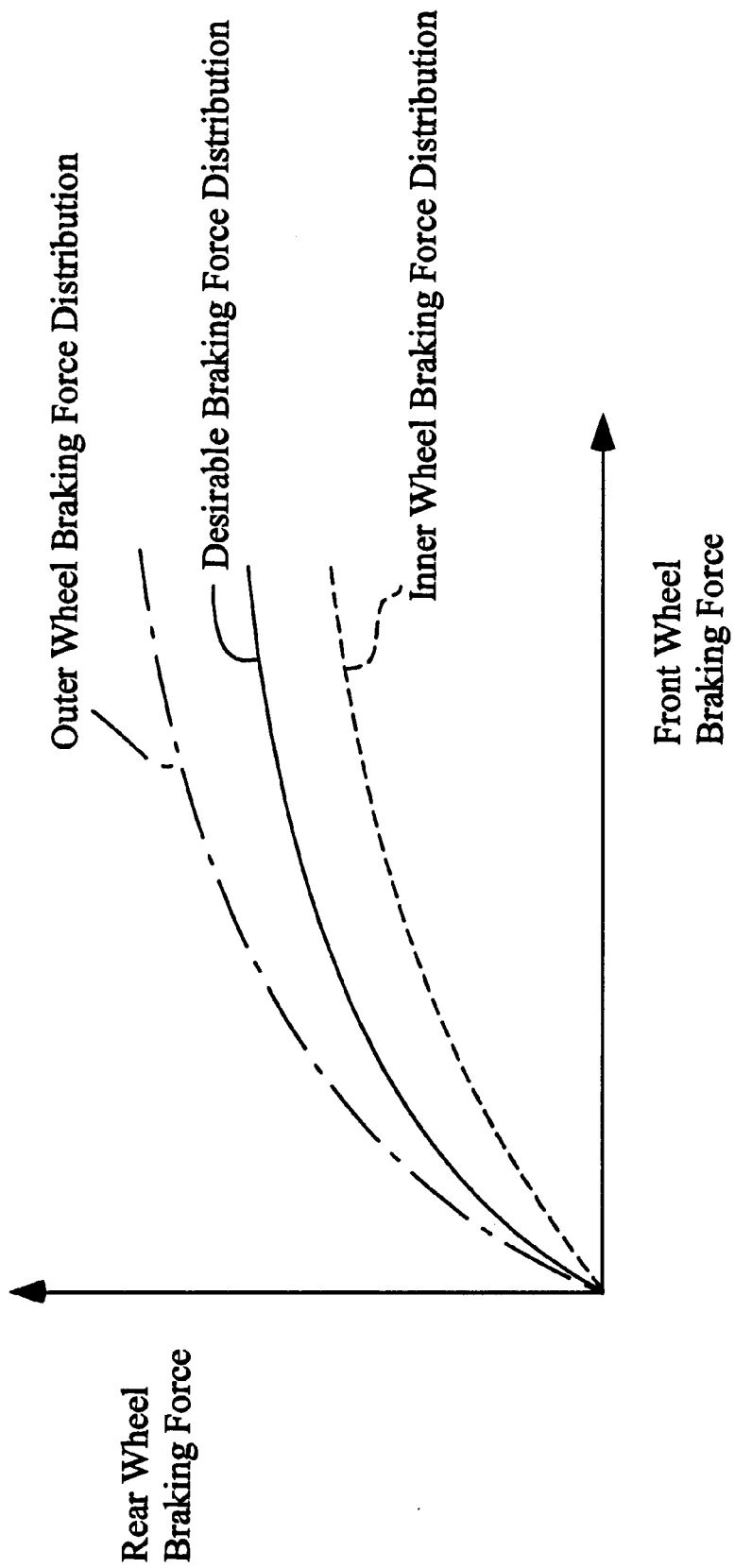
FIG. 4 is a characteristic view of the braking force distribution.

A desirable braking force distribution curve is as depicted in a continuous line in FIG. 4. There, when a vehicle is making a turn, i.e., driving through the corner, a rear wheel braking force for an outer wheel braking force distribution, as a dashed curve line, makes a larger curve than a desirable rear wheel braking force distribution while a rear wheel braking force for an inner wheel braking force distribution, as a broken curve line, makes a smaller curve than a desirable rear wheel braking force distribution.

In braking force distribution control, accurate control is achieved by considering the condition of the vehicle turning. Here, the condition of the vehicle turning, for example, is determined from the vehicle lateral acceleration (lateral G) and inner-outer wheel speed differences.

Prerequisites for Starting Brake Force Distribution Control

Figure 5:
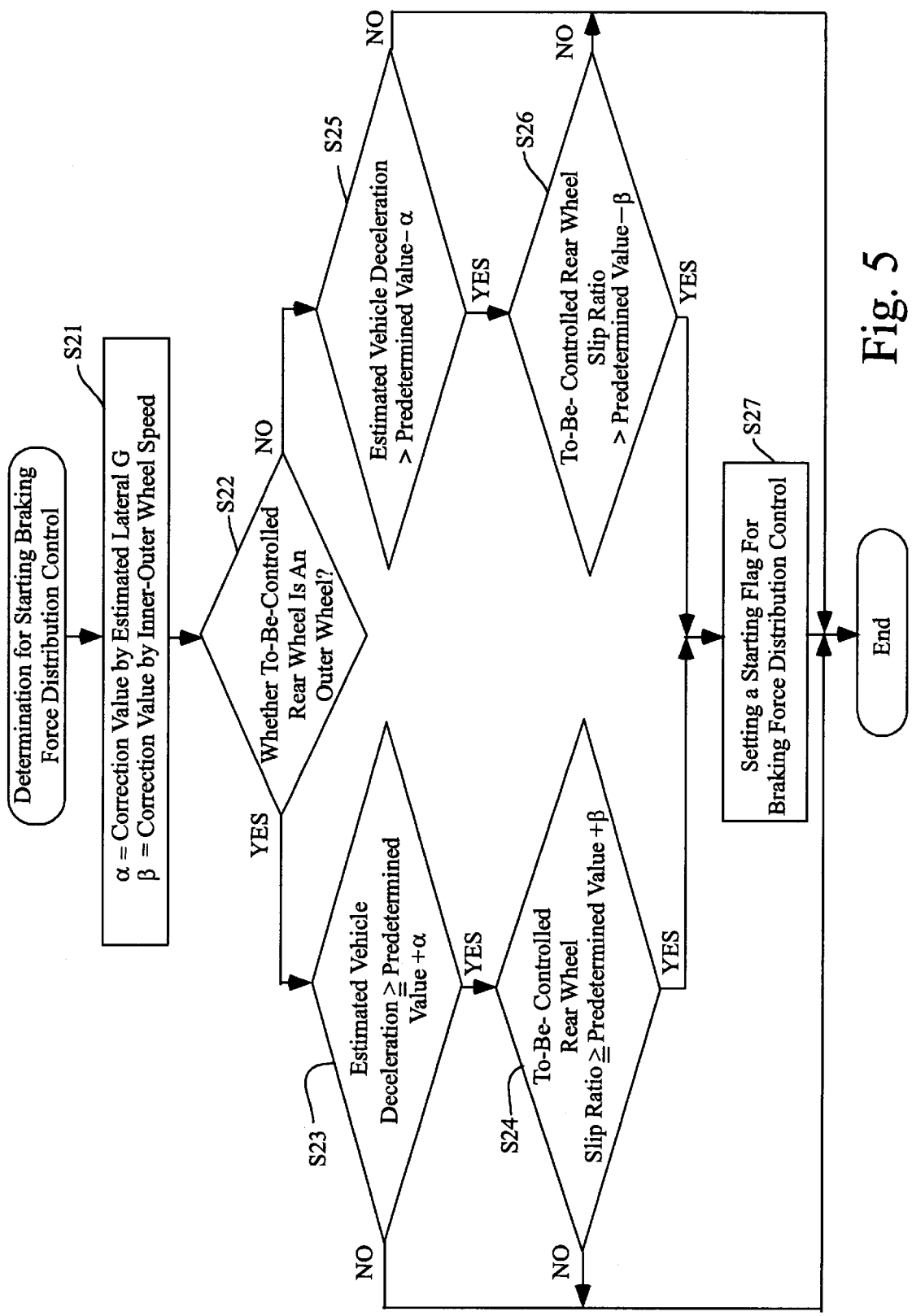
FIG. 5 is a flow-chart for a determination of the start of the braking force distribution.

Whether to conduct braking force distribution control is determined for example as shown in FIG. 5. First, the system determines a later explained correction value α and a later explained correction value β for a difference between an inner and an outer wheel speed. (S21) Second, it determines whether one rear wheel, which is subject to braking force distribution control (controlled wheel), is located at the inner side or the outer side of the curve. (S22) The difference between the inner wheel speed and the outer wheel speed is used to determine whether which rear wheel is located at the inner side and which at the outer side.

If the controlled wheel is located at the outer side of the curve, the system determines whether an absolute value of the estimated vehicle deceleration is larger than the deceleration threshold value. (S23) Here, the deceleration threshold value shall be a predetermined value plus the correction value α. If the absolute value of the estimated vehicle deceleration is larger, the system sends a flag of a command to start braking force distribution control (S27); or a slip ratio of the controlled wheel is larger than a slip threshold value when necessary (S24). Here, the slip threshold value is a threshold value plus the correction value β. If the slip ratio of the controlled wheel is larger, the system sets a flag of command to start braking force distribution control (S27).

The inner wheel is controlled when the absolute value of the estimated vehicle deceleration is determined to be larger than a deceleration threshold value (S23). Here, the deceleration threshold value is to be a value equal to the predetermined value plus the correction value α. If the deceleration threshold value is larger, the starting point for braking force distribution control to start braking force distribution is to be set (S27), or further, whether to-be-controlled rear wheel slip ratio is larger than a slip threshold value, if necessary, is determined (S26). The slip threshold value is to be a value equal to the predetermined value plus the correction value β. If the slip ratio is larger, the starting point for braking force distribution control to start braking force distribution is to be set (S27).

Accordingly, if the deceleration threshold value is arranged in consideration of the lateral G, braking force distribution control is accurately started. Further, as necessary, if the slip threshold value is arranged with consideration of inner-outer wheel speed differences, a rear wheel slip condition on the road surface becomes a factor for the determination to start accurate braking force distribution control. In addition, the correction values α, β are approximately zero while a vehicle is driving straight.

Correction Value α by Lateral G

The lateral G is a lateral acceleration of the vehicle and may be determined by a G sensor or as an estimated lateral G indirectly determined from a radius of gyration and a vehicle speed, etc. For instance, the estimated lateral G is equal to $V^2/R$. Here, V is an estimated vehicle speed, and R is a radius of gyration.

The correction value α by the lateral G is the deceleration threshold value changed in accordance with the lateral G, e.g., the lateral G multiplied by a proportional coefficient.

Correction Value β by Inner-Outer Wheel Speed Difference

The inner-outer wheel speed differential is the difference between the inner wheel speed and the outer wheel speed, e.g., a difference between the right rear wheel speed and the left rear wheel speed. The correction value β for the inner-outer wheel speed difference is the slip threshold value changed in accordance with the inner-outer wheel speed difference, e.g., the inner-outer wheel speed difference multiplied by a proportional coefficient.

Other Requirements for Starting of Braking Force Distribution Control

Figure 6:
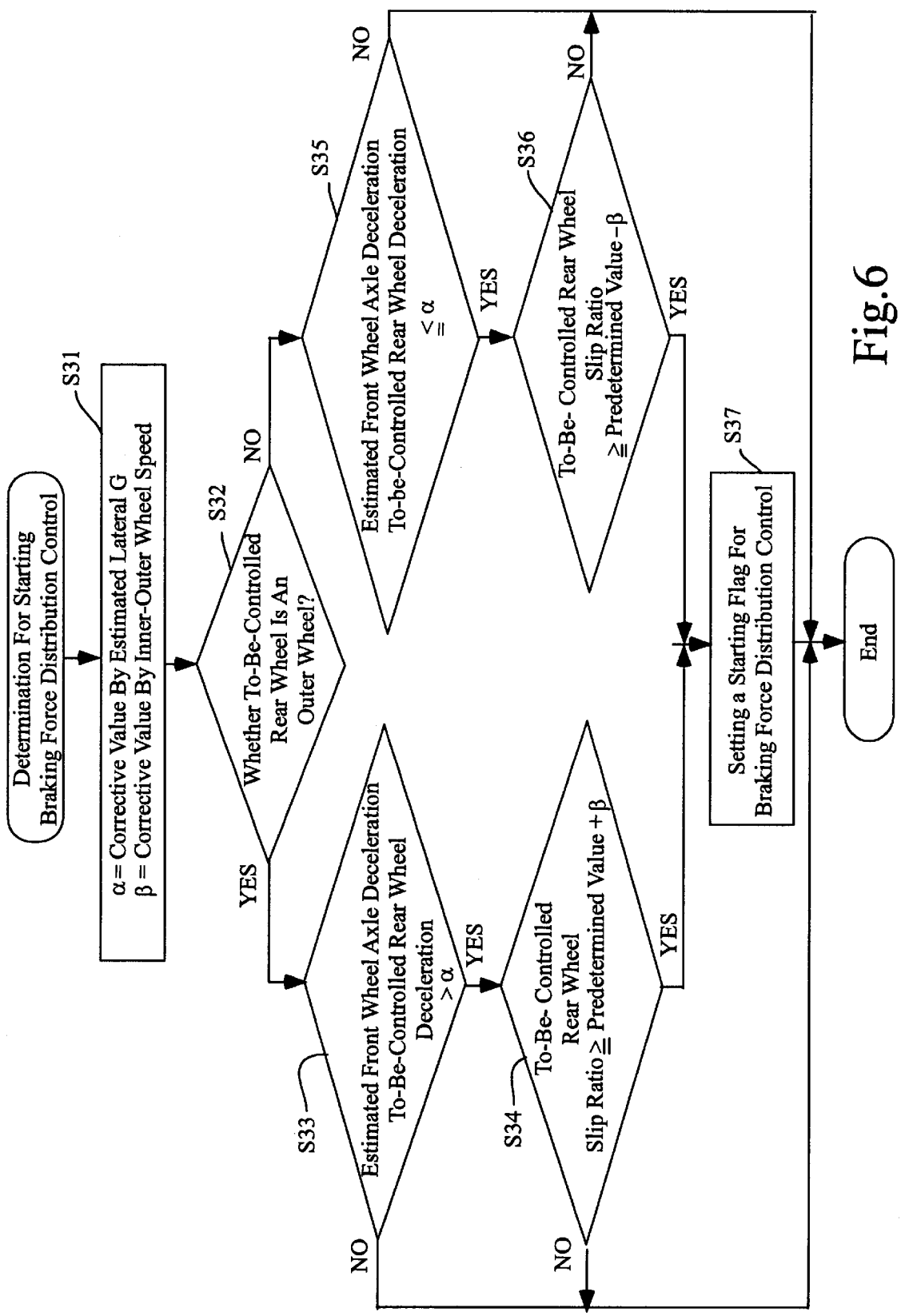
FIG. 6 is another flow-chart for a determination of the start of the braking force distribution control.

Other prerequisites for starting braking force distribution control are determined for example as shown in FIG. 6. The same steps already explained with reference to FIG. 5 are omitted here.

If the controlled wheel is located at the outer side of the curve, the system determines whether a difference between the absolute value of the estimated deceleration of the average of the two front wheels and the absolute value of the controlled (rear) wheel deceleration is larger than the correction value α. (S33) If it is smaller, the system sets a flag of command to start braking force distribution control (S37); or a slip ratio of the controlled wheel is larger than a slip threshold value when necessary (S34).

If the controlled wheel is at the inner side, the system determines whether a difference between an absolute value of the estimated deceleration of the average of two front wheels and the absolute value of the controlled (rear) wheel deceleration is smaller than the correction value α. (S35) If it is smaller, the system sets a flag of a command to start braking force distribution control (S37); or a slip ratio of the controlled wheel is larger than the slip threshold value when necessary (S36).

As such, the collection value α by the lateral G is compared with the degree of the difference between the estimated deceleration of the average of two front wheels and the controlled rear wheel deceleration. Effects of the lateral G to the road surface on which the rear wheel is driving, is considered to accurately start braking force distribution control.

Accordingly, braking force distribution control is accurately started by utilizing the effect of the lateral G relative to the rear wheel on the road surface with consideration to a comparison between the corrected value α by the lateral G and the extent of the difference between the estimated front wheel axle deceleration and to-be-controlled rear wheel deceleration.

Furthermore, the estimated front wheel axle deceleration is an estimation of wheel deceleration for two front wheel from such as wheel speed, e.g., by filtering, averaging, and applying a low pass filter (LPF). In addition, to-be-controlled rear wheel is a rear wheel subject to braking force distribution control.

Braking Force Distribution Control

The braking force distribution control governs the brake hydraulic pressure of the wheel cylinder of the rear wheel. Instead of using a proportioning valve (P valve), the braking force distribution control makes it possible to maintain the brake hydraulic pressure of the rear wheel at a low level compared to that of the front wheel. In addition, in an anti-lock brake control device, even when factors such as a motor and a pump fails, which prevents operation of anti-lock brake control, braking force distribution control controls the braking thereby making it possible to avoid rear wheel slip.

Figure 7:
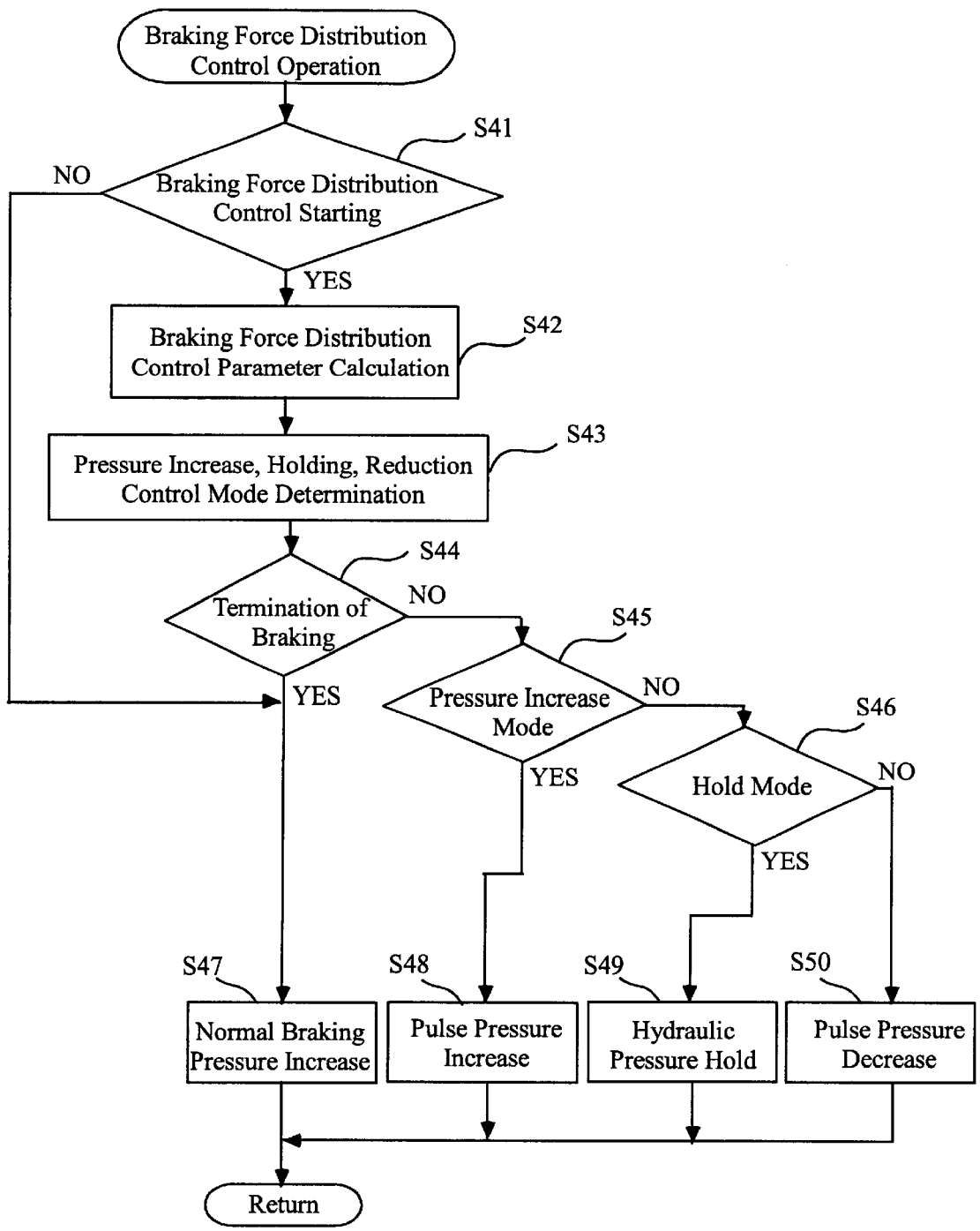
FIG. 7 is a flow-chart for braking force distribution control.

As shown in the flow-chart FIG. 7, data is gathered and "yes" and "no" questions answered in order to decide whether to start braking force distribution control (i.e., whether a start flag is set) (S41), or alternatively whether hydraulic pressure is increased with normal brake control (S47). If the point was set, parameters necessary for braking force distribution control such as rear wheel slip ratio relative to front wheels are determined (S42). The pressure increase mode, the pressure holding mode, or the pressure decrease mode of brake hydraulic pressure are selected from the parameters determined (S43). Thereafter a determination of whether braking force distribution control is to be determined is made (S44). If braking force distribution control is terminated normal brake control is operated (S47). However, if it is not terminated, hydraulic pressure provided to the rear wheel cylinder is increased (S48) held (S49), or decreased (S50) by going through the steps S45 and S46 based on the result of the brake control mode determination at the step S43.

Requirements for a Termination of Braking Force Distribution Control

Figure 8:
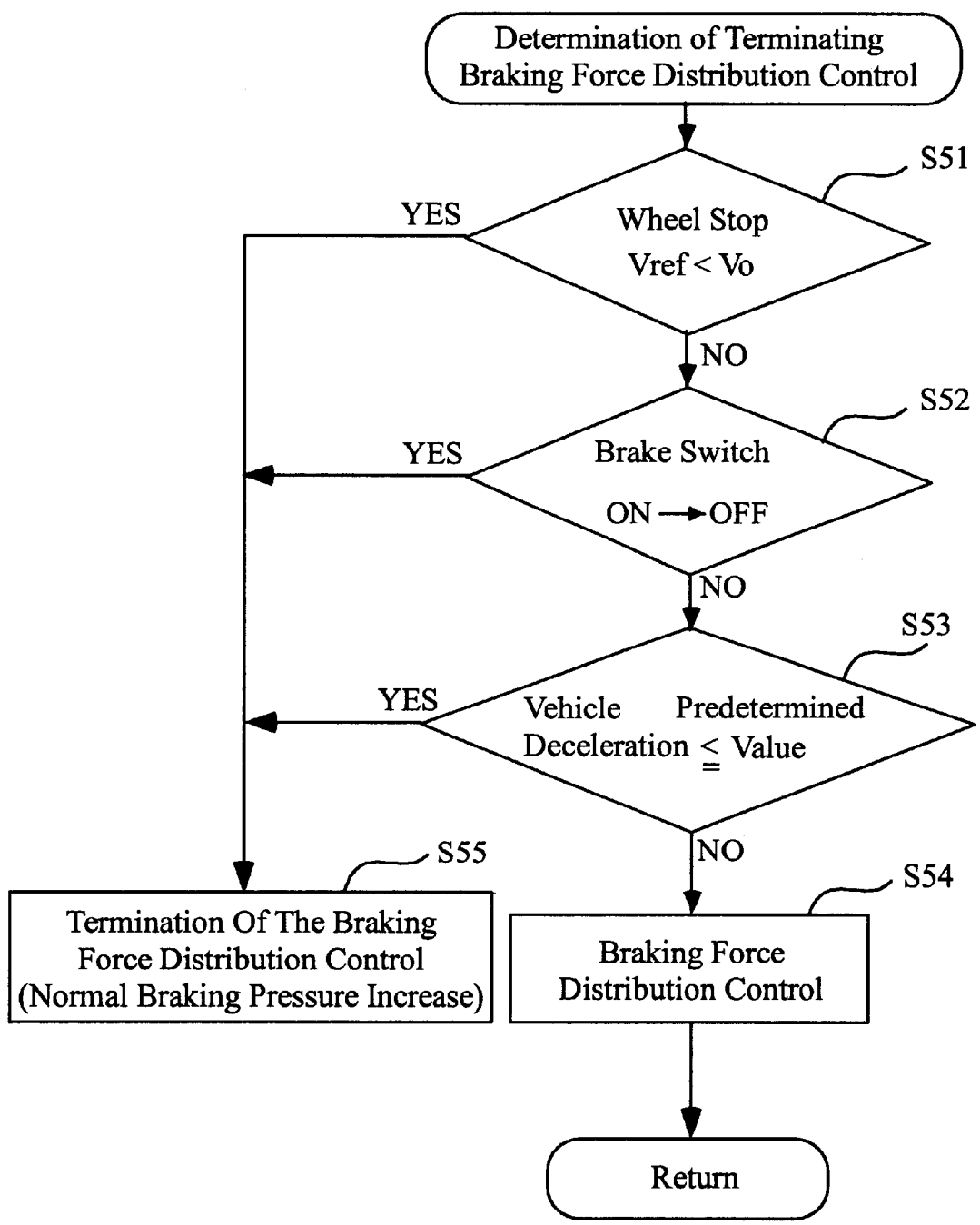
FIG. 8 is a flow-chart for a termination of braking force distribution control.

An early termination of braking force distribution control is preferable when the vehicle is operating under normal conditions. For example, as shown in FIG. 8, when a vehicle's speed is sufficiently low as not to require barking force distribution control the vehicle is close to being stopped (S51). For example, whether the estimated vehicle speed Vref is lower than the predetermined value Vl is determined. If the vehicle speed is reduced to near zero, the system shifts to normal brake control (S55).

If the estimated vehicle speed Vrf is higher than Vl, a determination is made as to whether the brake switch is on or off (S52). If the brake switch was turned off (from on), the braking operation is considered to be terminated and braking for distribution control is terminated thereby resuming normal brake control (S55). If the brake switch is kept on, whether the vehicle deceleration becomes smaller than the threshold value is determined (S53). If the vehicle deceleration is smaller than the threshold value, braking force distribution is terminated, and normal brake control is maintained (S55). If the vehicle deceleration is larger than the threshold value, braking force distribution control is operated (S54).

As described above, braking force distribution control is terminated not only when the vehicle deceleration is smaller than the threshold value but also by checking the estimated vehicle speed and the condition of the brake switch operation. Therefore, quick and accurate termination of braking force distribution control is achieved.

As such the invention has the following advantages:

This invention makes it possible to determine when to start braking distribution control when a vehicle is turning by considering the lateral G of the vehicle, thereby accurately operating braking force distribution control;

The threshold value of the slip ratio is used to determine the starting of braking force distribution control wherein starting control takes into consideration inner-outer wheel speed differences, thereby resulting in accurate braking force distribution control; and Whether to start braking force distribution control is determined with consideration to load shifting due to a difference between the front wheel axle deceleration and the rear wheel deceleration, thereby providing accurate braking force distribution control.

It is readily apparent that the above-described has the advantage of wide commercial utility. It should be understood that the specific form of the invention herein above described is intended to be representative only, as certain modifications with the scope of these teachings will be apparent to those skilled in the art.

U.S. Pat. Nos. 5,795,039; 5,887,957; 5,842,755; 5,947,221; 5,938,299; 5,826,954; 5,810,455; 5,951,115; 5,947,224; 5,947,221; 5,931,546; 5,927,830; 5,913,578; 5,882,093; 5,869,943; 5,857,754; 5,853,229; 5,829,847; 5,810,456; 5,810,455; 5,772,289; 5,762,406; 5,752,752; 5,752,211; 5,711,585; 5,700,074; 5,697,682; 5,676,434; 5,646,849; 5,641,209; 5,640,324; 5,634,699; 5,624,164; 5,620,239; 5,806,939 and 5,758,930 are incorporated by reference in their entirety to more fully disclose the present invention.

Accordingly, reference should be made to the following claims in determining the full scope of the invention.

What is claimed is:

1. A method of determining when and on which rear wheel brakes to activate braking force distribution control in a hydraulic brake system of a vehicle, which system comprises:

a hydraulic unit comprising a wheel speed sensor for detecting wheel speed, a main hydraulic circuit connecting a master cylinder to four wheel cylinders via inlet valves, and an auxiliary hydraulic circuit connecting the wheel cylinders to an auxiliary reservoir via outlet valves;

a means for detecting acceleration of a vehicle movement; and an electronic control device which controls the hydraulic unit;

wherein the method comprises the steps of:

independently determining the speed of rear wheels of the vehicle;

determining whether to apply braking force distribution control to an inner rear wheel or an outer rear wheel;

if the rear wheel subject to control stands an outer rear wheel, applying braking force distribution control to the outer rear wheel when a deceleration threshold value is increased according to acceleration of a vehicle lateral direction and the absolute value of vehicle deceleration exceeds the deceleration threshold value; and if the rear wheel subject to control is an inner rear wheel, applying braking force distribution control to the inner rear wheel when a deceleration threshold value is increased according to acceleration of a vehicle lateral direction and the absolute value of vehicle deceleration exceeds the deceleration threshold value.

2. The method of claim 1, wherein the means for detecting acceleration of movement is a G force sensor.

3. A method of determining when and on which rear wheel brakes to activate braking force distribution control in a hydraulic brake system of a vehicle, which system comprises:

a hydraulic unit comprising a wheel speed sensor for detecting wheel speed, a main hydraulic circuit connecting a master cylinder to four wheel cylinders via inlet valves, and an auxiliary hydraulic circuit connecting the wheel cylinders to an auxiliary reservoir via outlet valves;

a means for detecting acceleration of movement, and an electronic control device which controls the hydraulic unit;

wherein the method comprises the steps of:

determining wheel speed of at least two rear wheels;

determining whether to apply braking force distribution control to an inner rear wheel or outer rear wheel;

if the rear wheel subject to control is an outer rear wheel, applying braking force distribution control to the outer rear wheel when a deceleration threshold value is increased according to acceleration in a lateral direction, and the absolute value of vehicle deceleration exceeds the deceleration threshold value; and then a slip threshold value is increased according to a difference between inner wheel speed and outer wheel speed, and the rear wheel slip ratio exceeds the slip threshold value; and if the rear wheel subject to control is an inner rear wheel, applying braking force distribution control to the outer rear wheel when a deceleration threshold value is decreased according to acceleration in a lateral direction, and the absolute value of vehicle deceleration exceeds the deceleration threshold value; and then a slip threshold value is decreased according to a difference between inner wheel speed and outer wheel speed, and the rear wheel slip ratio exceeds the slip threshold value.

4. The method of claim 3, wherein the means for detecting acceleration of movement is a G force sensor.

5. A method of determining when and on which rear wheel brakes to activate braking force distribution control in a hydraulic brake system of a vehicle, which system comprises:

a hydraulic unit comprising a wheel speed sensor for detecting wheel speed, a main hydraulic circuit connecting a master cylinder to four wheel cylinders via inlet valves, and an auxiliary hydraulic circuit connecting the wheel cylinders to an auxiliary reservoir via outlet valves;

a means for detecting acceleration of movement; and an electronic control device which controls the hydraulic unit;

wherein the method comprises the steps of:

determining whether to apply braking force distribution control to an inner rear wheel or outer rear wheel;

if the rear wheel subject to control is an outer rear wheel, applying braking force distribution control to the outer rear wheel when an absolute value of front wheel axle deceleration minus an absolute value of outer rear wheel deceleration is smaller than a correction value relative to lateral acceleration; and if the rear wheel subject to control is an inner rear wheel, applying braking force distribution control to the inner rear wheel when an absolute value of front wheel axle deceleration minus an absolute value of outer rear wheel deceleration is smaller than a correction value relative to lateral acceleration.

6. The method of claim 5 wherein the means for detecting acceleration of movement is a G force sensor.

7. A method of determining when and on which rear wheel brakes to activate braking force distribution control in a hydraulic brake system of a vehicle, which system comprises:

a hydraulic unit comprising a wheel speed sensor for detecting wheel speed, a main hydraulic circuit connecting a master cylinder to four wheel cylinders via inlet valves, and an auxiliary hydraulic circuit connecting the wheel cylinders to an auxiliary reservoir via outlet valves;

a means for detecting acceleration of movement; and an electronic control device which controls the hydraulic unit;

wherein the method comprises the steps of:

determining whether to apply braking force distribution control to an inner rear wheel or outer rear wheel;

if the rear wheel subject to control is an outer rear wheel, applying braking force distribution control to the outer rear wheel when an absolute value of front wheel axle deceleration minus an absolute value of rear wheel deceleration is smaller than a correction value relative to a lateral direction; and then a slip threshold value is increased according to a difference between inner wheel speed and outer wheel speed, and the rear wheel slip ratio exceeds the slip threshold value, and if the rear wheel subject to control is an inner rear wheel, applying braking force distribution control to the outer rear wheel when an absolute value of front wheel axle deceleration minus an absolute value of rear wheel deceleration is smaller than a correction value relative to lateral acceleration; and then a slip threshold value is decreased according to a difference between inner wheel speed and outer wheel speed, and the rear wheel slip ratio exceeds the slip threshold value.

8. The method of claim 7, wherein the means for detecting acceleration of movement is a G force sensor.

* * * * *